(12) United States Patent
Edinger

(10) Patent No.: US 12,269,117 B2
(45) Date of Patent: Apr. 8, 2025

(54) LASER ADDITIVE MANUFACTURING SYSTEM

(71) Applicant: Ralf Edinger, Richmond (CA)

(72) Inventor: Ralf Edinger, Richmond (CA)

(73) Assignee: Ralf Edinger, Richmond (CA)

( * ) Notice: Subject to any disclaimer, the term of this patent is extended or adjusted under 35 U.S.C. 154(b) by 438 days.

(21) Appl. No.: 17/775,578

(22) PCT Filed: Nov. 11, 2020

(86) PCT No.: PCT/CA2020/051524
§ 371 (c)(1),
(2) Date: May 9, 2022

(87) PCT Pub. No.: WO2021/092680
PCT Pub. Date: May 20, 2021

(65) Prior Publication Data
US 2022/0395926 A1 Dec. 15, 2022

Related U.S. Application Data

(60) Provisional application No. 62/936,546, filed on Nov. 17, 2019.

(51) Int. Cl.
*B29C 64/364* (2017.01)
*B23K 26/06* (2014.01)
(Continued)

(52) U.S. Cl.
CPC .......... *B23K 26/0648* (2013.01); *B23K 26/12* (2013.01); *B29C 64/153* (2017.08);
(Continued)

(58) Field of Classification Search
CPC .............................. B29C 64/25; B29C 64/364
See application file for complete search history.

(56) References Cited

U.S. PATENT DOCUMENTS 9,956,612 B1 * 5/2018 Redding .............. B23K 26/082
2001/0002287 A1 * 5/2001 Kar ........................ B22F 12/41
427/205

(Continued)

FOREIGN PATENT DOCUMENTS

WO 2017011456 A1 1/2017

OTHER PUBLICATIONS

International Search Report in International Application No. PCT/CA2020/051524 issued Mar. 2, 2021.

(Continued)

*Primary Examiner* — Timothy Kennedy

(57) ABSTRACT

Examples of a laser additive manufacturing system are described. The system comprises a laser configured to generate a laser beam, a fiber optic coupled to the laser to transmit the laser beam to a laser optic head that is coupled to the fiber optic and comprises a focus lens to focus the light beam. The laser optic head is configured to slide along a sliding mechanism in X-direction. A powder feeder is used to continuously move in Y-direction and dispense an uniform layer of powdered material onto a powder bad that is positioned on a build plate of the building chamber. The build plate is configured to move in Z-direction. The light beam generated by the laser is focused using the laser optic head onto a small region of the powder bed where the powdered material is positioned producing small volumes of melt pools that are then cooled and a new layer of powdered material is dispensed over it.

15 Claims, 9 Drawing Sheets

(51) Int. Cl.
 *B23K 26/12* (2014.01)
 *B29C 64/153* (2017.01)
 *B29C 64/232* (2017.01)
 *B29C 64/245* (2017.01)
 *B29C 64/25* (2017.01)
 *B29C 64/268* (2017.01)
 *B29C 64/321* (2017.01)
 *B33Y 10/00* (2015.01)
 *B33Y 30/00* (2015.01)
 *B33Y 70/10* (2020.01)

(52) U.S. Cl.
 CPC .......... *B29C 64/232* (2017.08); *B29C 64/245* (2017.08); *B29C 64/25* (2017.08); *B29C 64/268* (2017.08); *B29C 64/321* (2017.08); *B29C 64/364* (2017.08); *B33Y 10/00* (2014.12); *B33Y 30/00* (2014.12); *B33Y 70/10* (2020.01)

(56) References Cited

U.S. PATENT DOCUMENTS

| | | | |
|---|---|---|---|
| 2010/0323301 A1* | 12/2010 | Tang | G03F 7/0037 430/325 |
| 2013/0101803 A1* | 4/2013 | Grebe | B29C 64/129 264/497 |
| 2014/0175708 A1* | 6/2014 | Echigo | B29C 64/286 264/460 |
| 2016/0136731 A1* | 5/2016 | McMurtry | B29C 64/153 419/53 |
| 2017/0021454 A1 | 1/2017 | Dallarosa et al. | |
| 2017/0259339 A1* | 9/2017 | Riva | B22F 10/32 |
| 2018/0133956 A1* | 5/2018 | Buller | B33Y 50/02 |

OTHER PUBLICATIONS

Written opinion on Patentability of International Application No. PCT/CA2020/051524 issued Feb. 8, 2021.

* cited by examiner

LASER ADDITIVE MANUFACTURING SYSTEM

CROSS REFERENCE TO RELATED APPLICATIONS

This application is a U.S. National Stage Application of International application No. PCT/CA2020/051524 filed Nov. 11, 2020, which claims priority from U.S. Patent Application No. 62/936,546 filed on Nov. 17, 2019. The entirety of all the above-listed applications are incorporated herein by their reference.

TECHNICAL FIELD

The present disclosure relates to a laser additive manufacturing system and more particularly to a laser additive manufacturing system with moving laser optic head.

BACKGROUND

Additive manufacturing is a process that uses data computer-aided-design (CAD) software or 3D object scanners to direct hardware to deposit material, layer upon layer, in precise geometric shapes, so that the products are manufactured by melting the material (e.g., a powder), layer by layer. In the additive manufacturing systems the material is added to create an object while in the traditional processes of product manufacturing, such as machining, casting, fabricating it is often necessary to remove material through milling, machining, carving, shaping or other means. The additive manufacturing systems for metal products use laser or electron beam gun as a heat source for melting a metal powder or a metal wire, layer by layer. The process usually consists of three major steps: 1) preheating a powder bed workpiece to higher temperature depending on the material/metal 2) depositing and spreading a thin layer (in microns) of the metal powder on the powder bed, and 3) melting the powder using a computer-controlled laser or electron beam. The known laser additive manufacturing systems typically use a system of moving optical parts (e.g. deflection mirrors, lens and/or coils) to change/deflect the direction or path of the beam to a different focal spot to melt the powder deposited at such different focal spot making such systems expensive and complicated.

SUMMARY

In one aspect, a laser additive manufacturing system is provided. The system comprises a laser configured to generate a laser beam, a fiber optic coupled to the laser to transmit the laser beam to a laser optic head that is coupled to the fiber optic and comprises a housing and a focus lens to focus the laser beam. The laser optic head is in communication to a driver that slide the laser optic head along a sliding mechanism in x-direction. A powder feeder is used to continuously move in Y-direction using a feeder driver and dispense an uniform layer of powdered material onto a powder bad that is positioned on a build plate of the building chamber. The build plate is coupler to a plate driver that moves the build plate in Z-direction. The laser beam generated by the laser is focused using the laser optic head onto a small region of the powder bed where the powdered material is positioned producing small volumes of melt pools that are then cooled and a new layer of powdered material is dispensed over it.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

Figure 1:
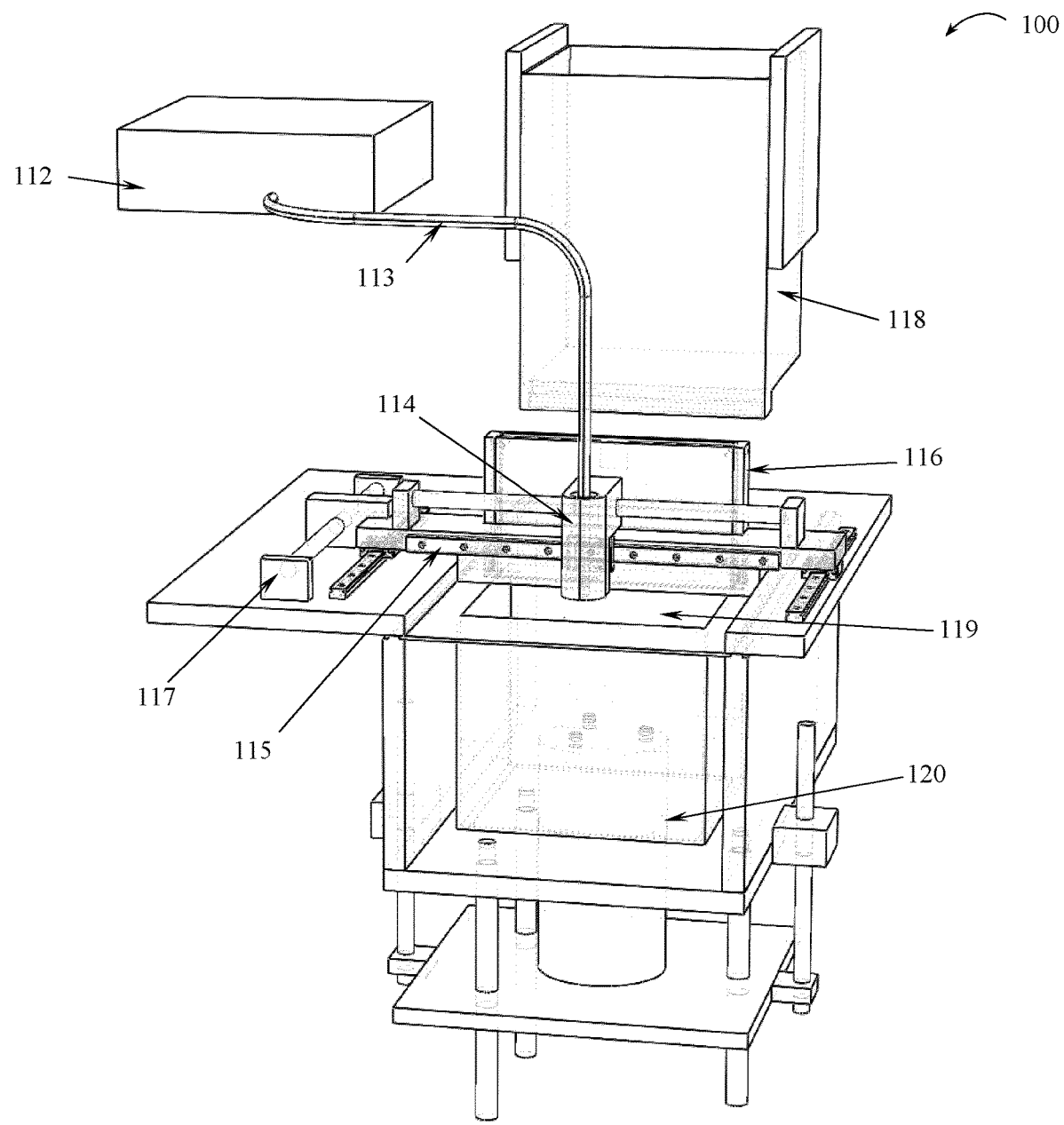
FIG. 1 is a perspective cross-sectional view of an example of a laser additive manufacturing system of the present invention.
Figure 2:
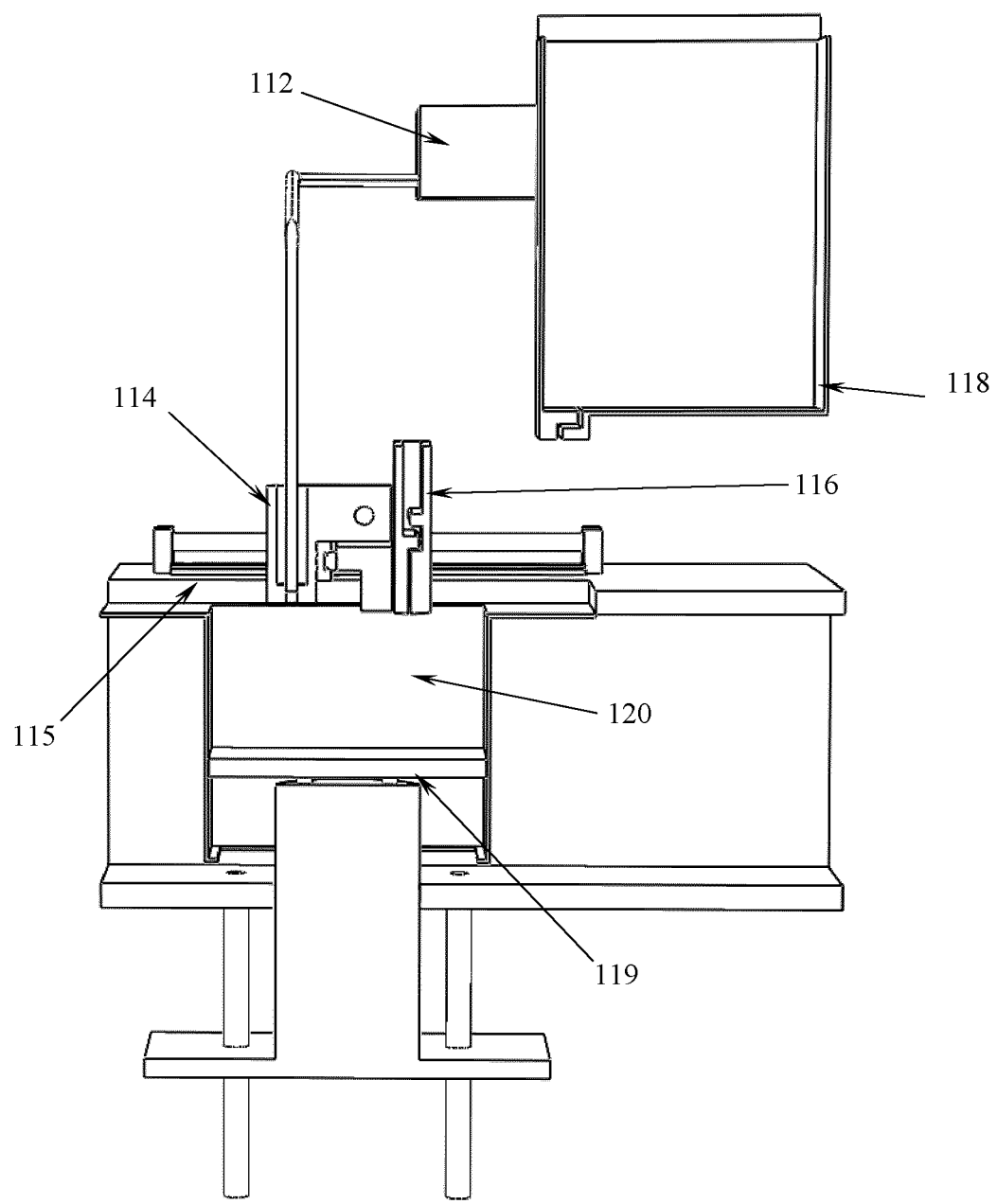
FIG. 2 is a side cross-sectional view of the laser additive manufacturing system of FIG. 1 showing a flying laser optic head sliding along a rail mechanism.

FIG. 1 illustrates a laser manufacturing system (LMS) 100 that comprises an energy source, such as a laser 112 configured to generate a laser beam, a fiber optic 113 coupled to the laser 112 to transmit the light beam to a flying laser optic head 114 that is coupled to the fiber optic and comprises a focus lens 620 (FIG. 6) to focus the laser beam at a predetermined point in space. The laser 112 can be a CO2 laser, a laser diode, a YAG type laser or any other suitable laser. The generated energy beam can be in a wavelength that is easily absorbed by a material. For example, when the material is a metal powder the wavelength of the generated energy beam can be selected between 750-900 nm. The flying laser optic head 114 is configured to slide along a sliding mechanism 115 in X-direction. The sliding mechanism can be for example a rail system or any other suitable system. The optical head can be driven back and forward along the rail by a motor (not shown). A building chamber 120 is operatively coupled to the laser 112 and the laser head 114. A build plate 119 is positioned in the building chamber 120 and is configured to be moved in Z-direction up and down to provide layer-by-layer structure of the product. A powder feeder 116 is also positioned within the chamber 120 to dispense a controllable amount of powdered material onto a powder bad formed on the build plate 119. The powder feeder 116 is driven in Y-direction by a moving platform 117. In one implementation, the powder feeder 116 can be mounted on the moving platform 117 and can be at some pre-determined distance above the build plate 119. The moving platform 117 can move the powder feeder 116 in Y direction, so that a layer of the powdered material can be laid on the powder bed without using a spreader, such as a rake or a comb that is usually used in the known additive manufacturing systems. The powder can be for example a metal or an alloy powder. In one embodiment, the powder material can be a polymer material (e.g., a plastic). In one implementation, the building chamber is filled with an inner gas, such as for example an argon, to prevent oxidation of the metal powder. The build plate 119 is configured to move up and down in Z-direction. The laser beam generated by the laser 112 is focused using the laser optic head 114 to converge the beam radially to form a focal spot on the powder bed where the powdered material is positioned producing a melt pool. As the optic head 114 moves along the rail 115 the beam is focused to a different focal spot to melt the powder deposited at such different focal spots thus forming small volumes of melt pools. The melting pools are then rapidly solidified forming a layer of a product. Then this process is repeated to add additional powder layers and get a layer-by-layer fabrication of the work product. The laser beam is moving from one focal point to another by moving the flying optical head 114 instead of deflecting the beam using complex and expensive deflective lens, mirrors and/or coils. FIG. 2 illustrates more clearly the flying laser optic head 114 sliding along the rail mechanism 115.

Figure 3:
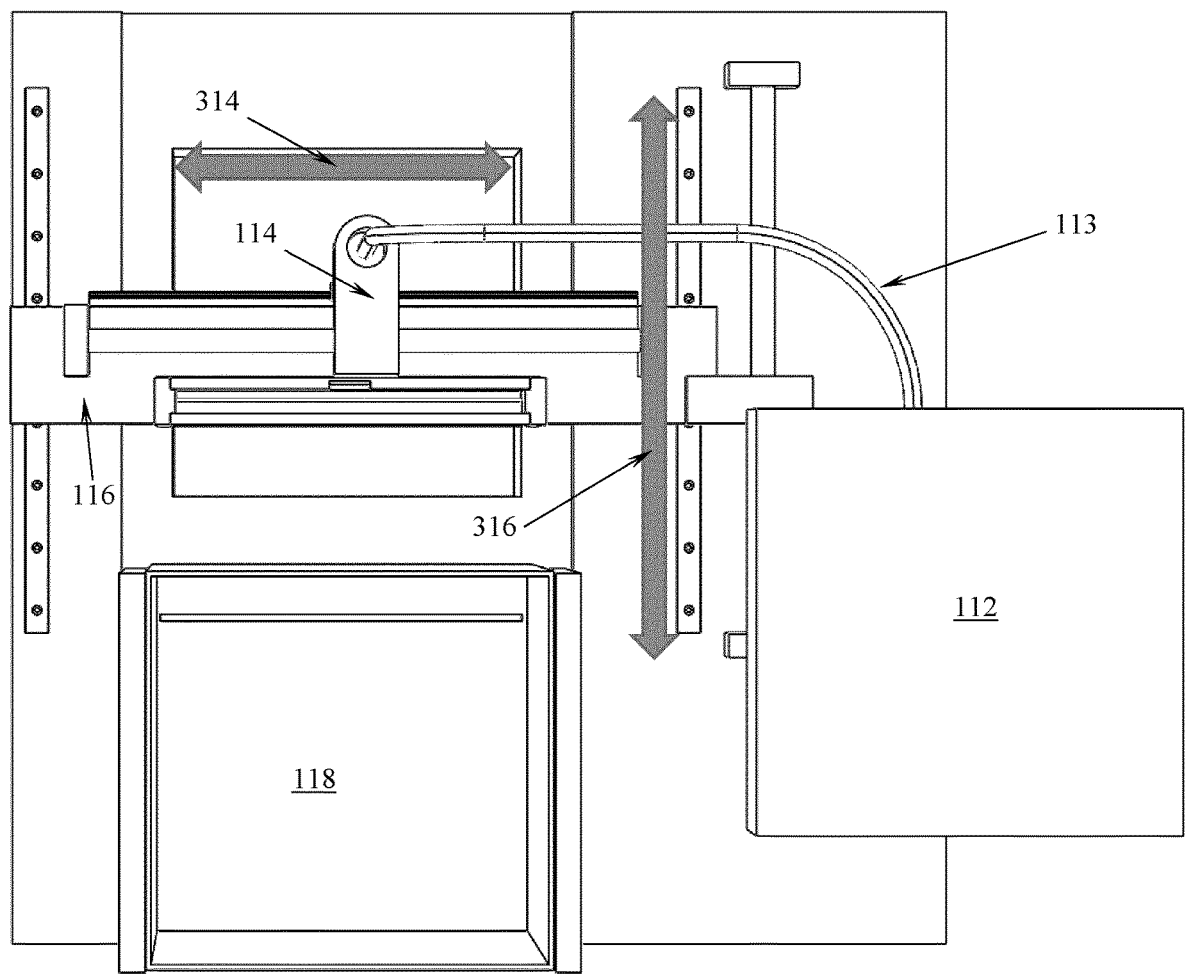
FIG. 3 is a top view of the laser additive manufacturing system of FIG. 1 showing a laser optic head moving in X-direction and a powder feeder moving in Y-direction.
Figure 4A:
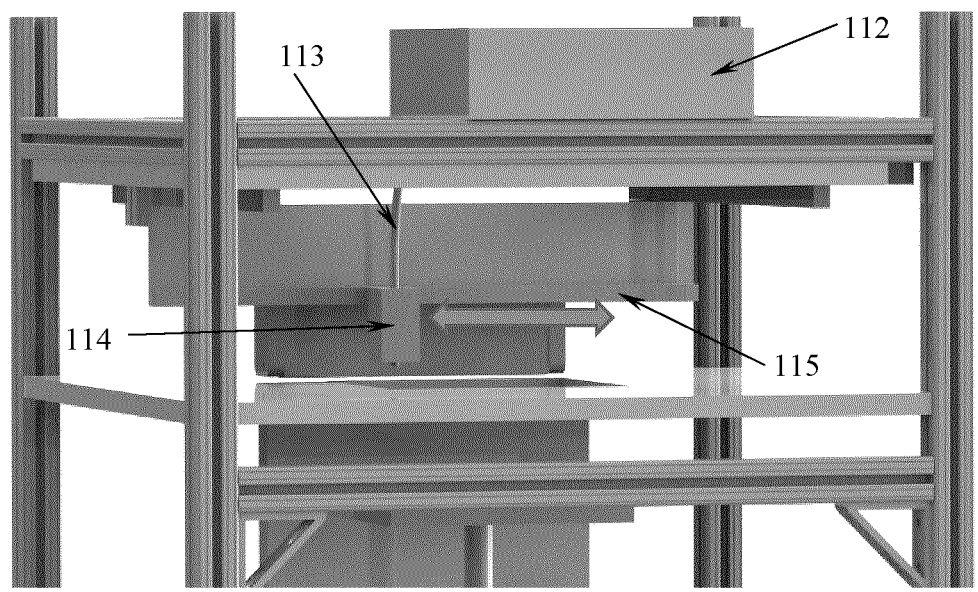
FIG. 4A is a perspective cross-sectional view of an example of a laser additive manufacturing system showing a flying laser optic head moving in X-direction.
Figure 4B:
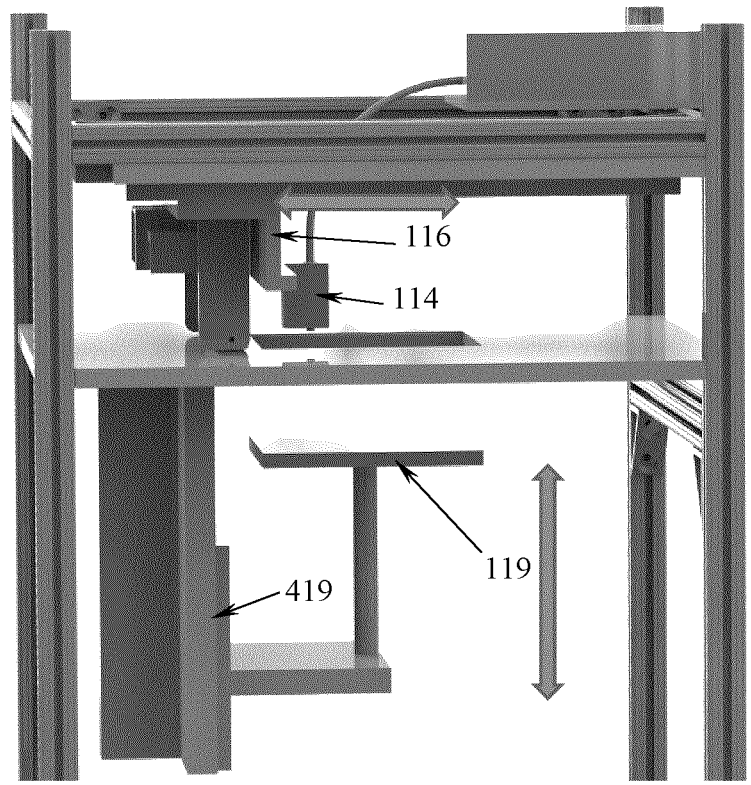
FIG. 4B shows a powder feeder moving in Y-direction and a build plate moving in Z-direction.

FIG. 3 is a top view of the laser manufacturing system 100 showing the laser 112 coupled to the flying laser optic head 114 through the fiber 113. As illustrated the optic head 114 moves in X-direction (shown by arrow 314) while the powder feeder 116 slides in Y-direction (shown by the arrow 316). FIGS. 4A and 4B further show the laser manufacturing system 100 with the optic head 114 moving in X-direction (FIG. 4A), the powder feeder moving in Y-direction (FIG. 4B) and the build plate 119 moved in Z-direction. The build plate 119 can be driven up and down by a driving system 419 that can be similar to the driving system of the optic head or the powder feeder. In one implementation, a controller is provided operatively coupled to the driver of the powder feeder 116 and the driver of the laser optic head 114 to synchronize their movement, such that as the powder feeder 116 dispense the powder on the powder bed, it is simultaneously melted by the laser beam. This means that the controller controls the triggering time of the powder feeder 116 and the laser 112 as well as the position of the optic head 114 and the powder feeder 116.

The powdered material is stored in a powder container 118 that is operatively coupled to the powder feeder 116. The powder container 118 stores the powdered material so that the feeder 116 can be refiled when required. There can be more than one powder container 118 operatively coupled to the powder feeder 116. The multiple containers can store same or different material. In one implementation, one container 118 can contain a metal/alloy powder while another container 118 can comprise a plastic material so that such laser additive system can be used to manufacture parts with mixed metal and plastic components. In another implementation different metal powders can be stored in each of the containers. In yet another implementation, each of the powder containers 118 can contain same powdered material. Each of the powder containers 118 can be coupled to the same or separate powder feeder 116. One or more level sensors (not shown) can be provided in the powder feeder 116 to measure the level of the powdered material in a dispensing chamber 512 of the feeder 116 (see FIG. 5). The level sensors can trigger opening of a valve (not shown) to refill the feeder 116 when the material level in the chamber 512 of the feeder 116 is low, below a threshold. The level sensor can be an optical, inductive or mechanical type of known sensors.

Figure 5:
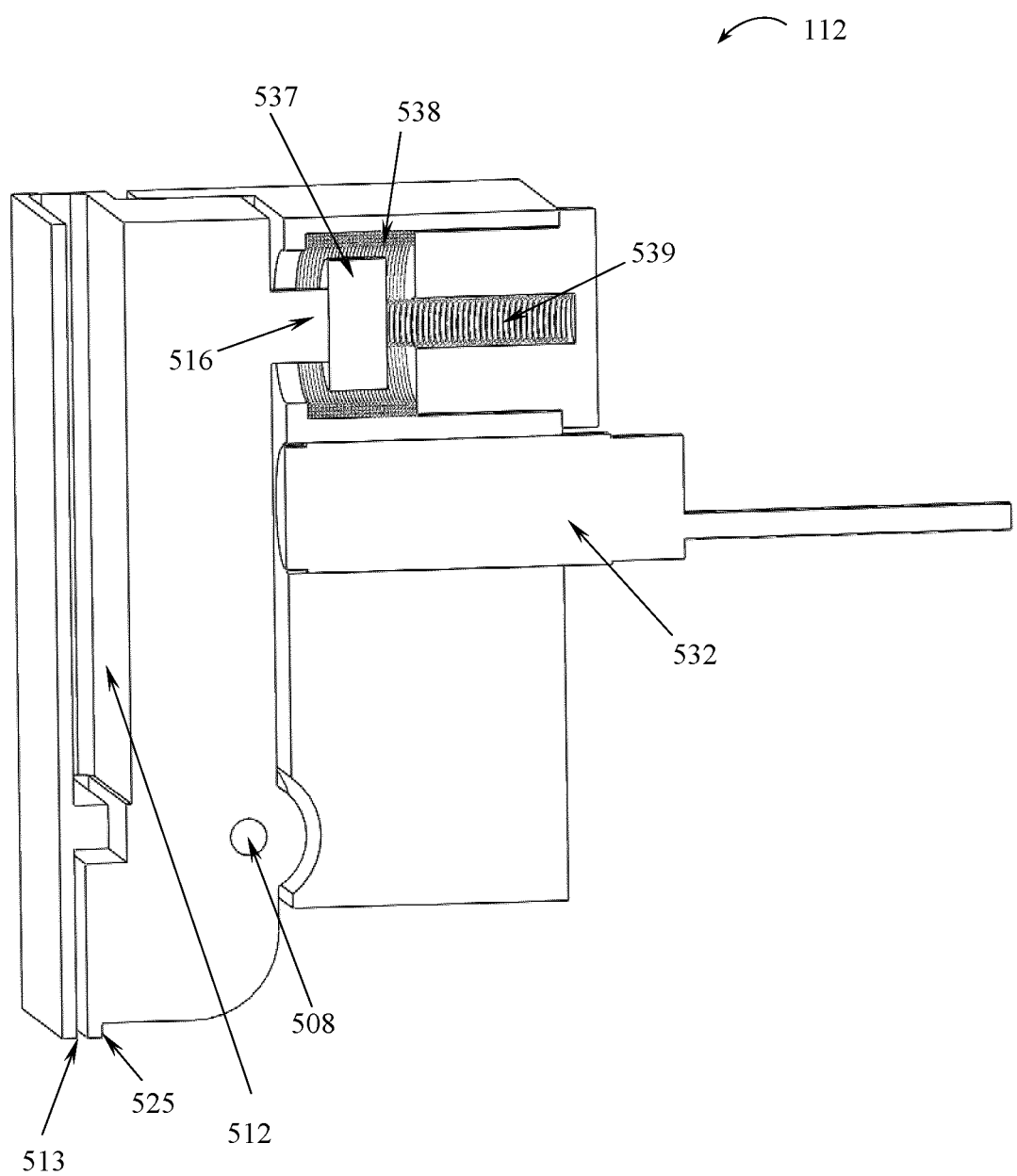
FIG. 5 is a perspective cross-sectional view of an example of a powder feeder.

FIG. 5 further illustrates details of the powder feeder 116. The powder feeder 116 can comprise the dispensing chamber 512 and a vibration system 516. The dispensing chamber 512 defines the inner cavity into which the powdered material is inserted. The inner cavity has an inlet that is in fluid communication with an outlet of the powder container 118 and a dispensing opening 513. The powdered material can flow out of the opening 513 partially under gravity. The dispensing opening 513 can have various dimensions and shapes depending on the size and/or shape of the material's particles. The vibration system 516 is adjacent to the dispensing chamber 512 and can generate vibration of the dispensing chamber 512 to provide continuous flow of the powdered material during vibration. The vibrator can be driven mechanically (e.g. a mechanical arm or a cam connected to the head and driven by a motor) or electromagnetically. In the illustrated example, the dispensing opening 513 is configured as a dispensing slot, such that the powdered material is dispensed out through the slot 513 as a curtain of fluidized powdered material during vibration of the dispensing chamber 512. An edge 525 of the dispensing slot 513 can also be used for leveling the powdered material on a powder bed. For example, a point of rotation 508 (pivoting) of the dispenser slot 513 can be positioned as close as possible to the edge 525. At the beginning of the operation the edge of the nozzle of the dispensing slot 513 can be brought in contact with the powder bed, then the dispensing slot 513 can be lifted to a pre-determined distance from the powder bed, e.g. 50 µm away from the powder bed. As the vibration system 516 generates vibrations of the dispensing chamber 512 it triggers flow of the powdered material on the powder bed while the edge is leveling the powdered layer preventing any layer inconsistence. In addition, the vibration of the dispensing chamber 512 may cause tapping motion of the edge 525 of the slot 513 to the powder bed further enhancing the continuous flow and compacting of the powdered material onto the powder bad.

In one implementation, the vibration system 516 can comprise a permanent magnet 537 that is directly connected to the housing of the dispensing chamber 512 and a coil 538. The coil 538 is operatively coupled to a power source (not shown) so that when a current flow in the coil 538 it generates magnetic field. The magnetic field of the coil 538 reacts with the magnetic field of the permanent magnet 537, attracting or repelling depending on the direction of the current flow, thus directly vibrating (pushing/pulling) the dispensing chamber 512 and the dispensing slot 513. A spring 539 can be added at the back of the permanent magnet 537 to stabilize the dispensing chamber 512 when there is no current in the coil 538. In addition, a displacement sensor 532 positioned close to the dispensing chamber 512 can be added to measure the mechanical movement (displacement) of the dispensing chamber 512 during operation. The displacement sensor can send an input signal to the controller (not shown). Optionally, another displacement sensor (not shown) can be added in proximity to the powder container 118 to measure the mechanical vibration (displacement) of the powder container 118. Depending on the size of the dispensing slot 513, an optimal frequency can be established and then an amplitude at such frequency is optimized. The amplitude is defined as the tapping force/power. For example, if the power source provides more current to the coils 538, the obtained tapping force on the dispensing chamber 512 will be stronger, resulting in higher amplitude of the vibration to push the powder through the dispensing opening/slot 513. The optimization of the frequency (length of the stroke) and the amplitude (power of the stroke) for a given powdered material can be done through an experimental iteration.

Figure 6:
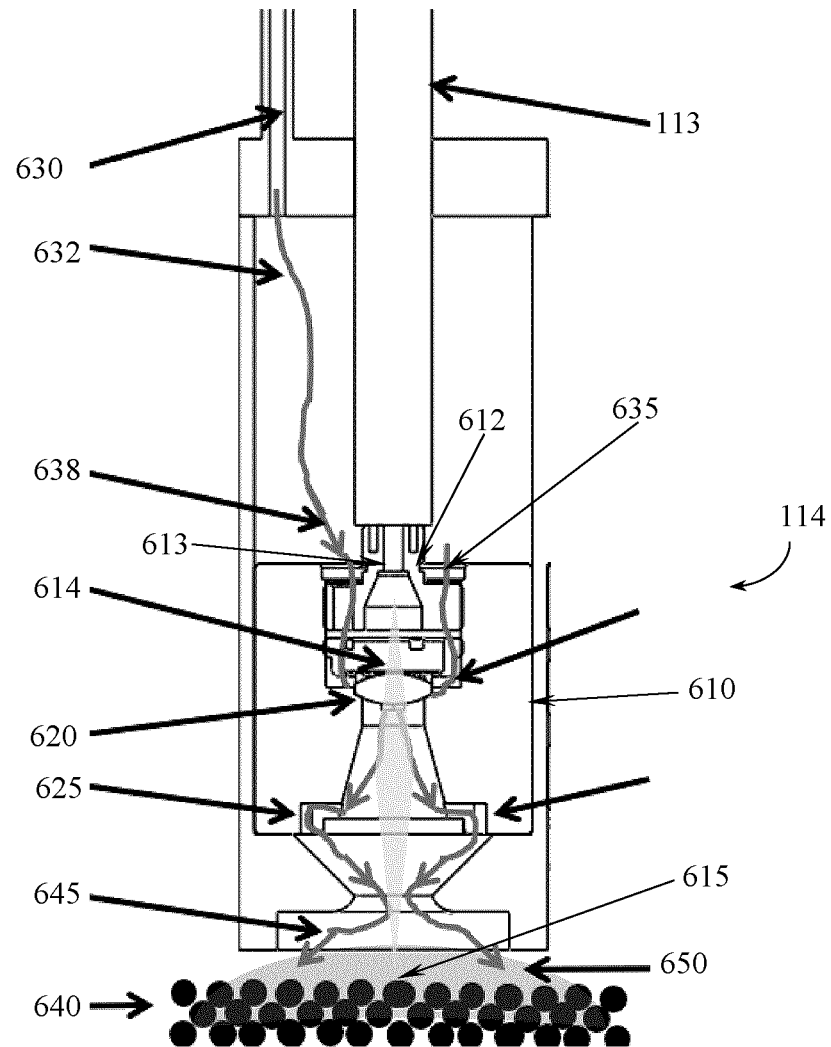
FIG. 6 is a side cross-sectional view of an example of a laser optic head.

FIG. 6 illustrates in details an example of the laser optic head 114. The optic head 114 can comprises a housing 610. The fiber optic 113 enters the housing 610 through an opening 612 formed in the housing 610. The fiber optic 113 has an outlet 613 such that the energy beam 614 exiting the outlet 613 impinges to the focus lens 620 that focuses the energy beam 614 to a predetermined focal point 615 which position is determined by the position of the optic head 114. The optic head 114 can further comprise a laser window 625 that prevents metal vapor damaging the lens 620. The lens 620 precisely focuses the laser beam so that the shape of the focus spot 615 and the density of the energy in that spot are consistent. In one implementation, a curved mirror can be use to focus the laser beam. The high-power density results in rapid heating, melting and partial or complete vaporizing of the material. In order to cool the optics in the head 114, a compressed gas is injected into the housing 610 of the optic head 114. A gas supply 630 is coupled to a gas chamber 632. The gas flows into the gas chamber 632 and through a gas flow nozzle 635 into the optic head housing 610. As illustrated in the figure by a gas flow path 638, the gas flows around the lens 620 and the window 625 cooling the optics. The gas further can protect the metal powder 640 from oxygen and humidity. A shield gas cup 645 can be used to provide a gas shield 650 over the powder in proximity to the focal point 615 thus protecting the powder from oxidisation and vapour back streaming onto the window 625. The laser beam 614 focused by the lens 620 passes through a bore (not shown) formed in the window 625 and the shield cup 645 before it hits the focal point 615 on the metal powder 640 and forms a melting pool. The gas can be Argon, a mixture or Argon and CO2 or any other suitable inert gas.

Figure 7:
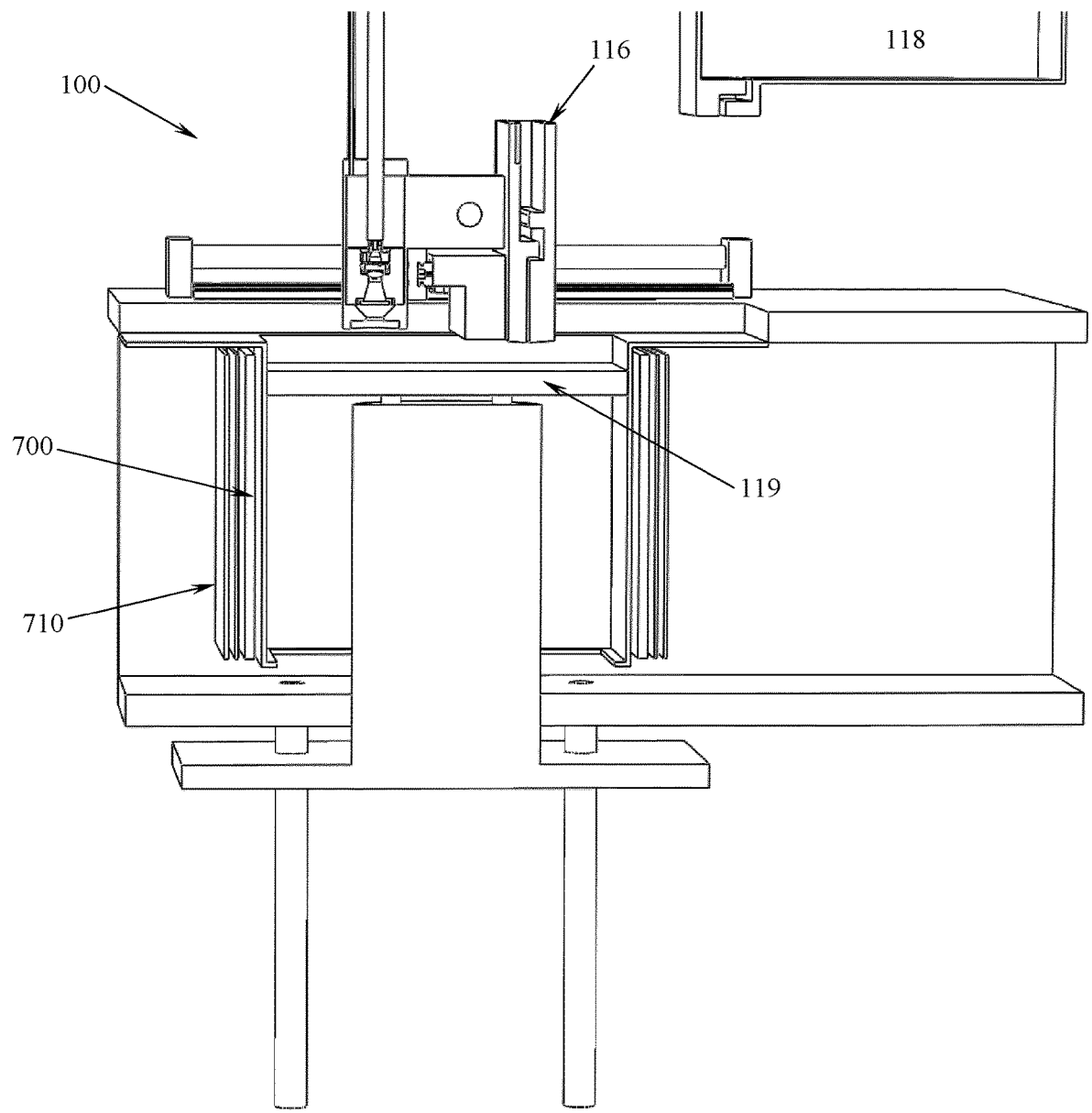
FIG. 7 is a side cross-sectional view of a laser additive manufacturing system showing a heating system for a building chamber.

In order to reduce mechanical stress in the build part the powder bed formed on the build plate 119 is preheated at predetermined temperatures (e.g., between 100°-800° C. depending on the material). For example, as illustrated in FIG. 7, a heating element 700 can be positioned in the building chamber 120 to heat the powder bed. A heat shield 710 can also be provided to protect the surrounding components of the system 100 as well as prevent heat dissipation away of the powder bed. In one implementation, the powdered material can be preheated before entering the powder feeder 116. For example, the powdered material exiting the storage container 118 can enter an elongated heater (not shown), where it can be heated to a predetermined temperature before entering the feeder 116. In another implementation, the powder material can be preheated in the feeder 116 by for example placing a heater in the feeder 116 or around the dispensing opening to pre-heat the dispensed powdered material.

Figure 8A:
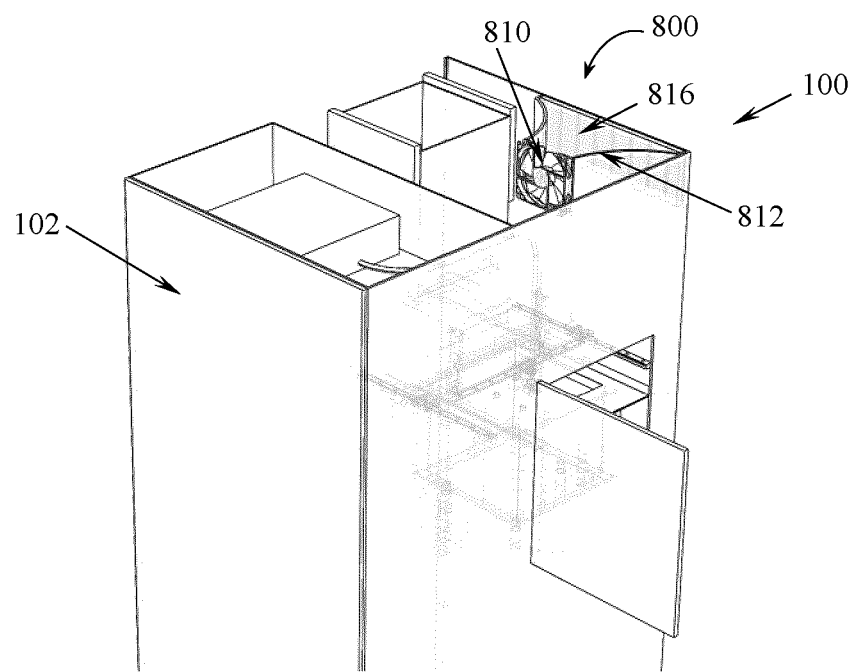
FIGS. 8A and 8B is a perspective view of an example of a laser additive manufacturing system showing a fume extraction system.
Figure 8B:
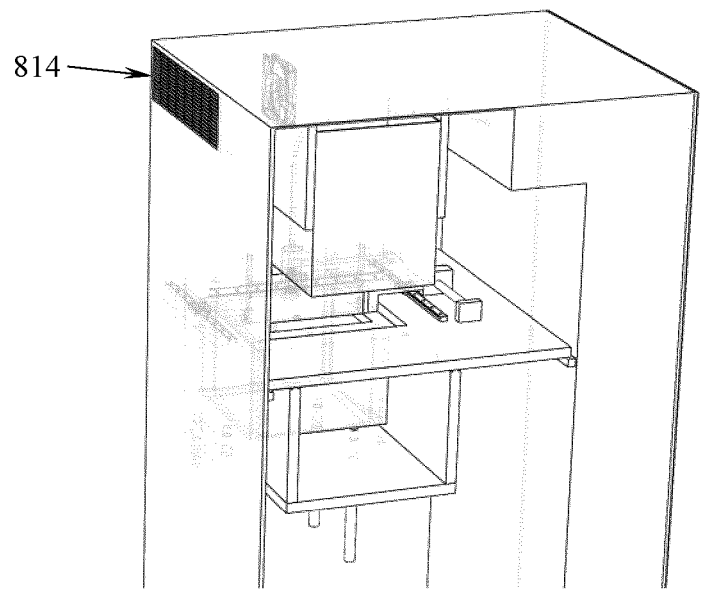

FIGS. 8A and 8B illustrate the laser additive manufacturing system 100 and a fume extraction system 800 used to extract any gas fumes out of a container 102. The fume extraction system 800 can comprise a fan 810 used to pull any gas present in the container 102 into a fume extraction housing 812 and through an outlet 814 (FIG. 8B) out of the container 102 of the system 100. The fume extraction system 800 can further comprise a filter 816 to filter the gas fumes before releasing them out to preventing any toxics being released out of the system.

Figure 9:
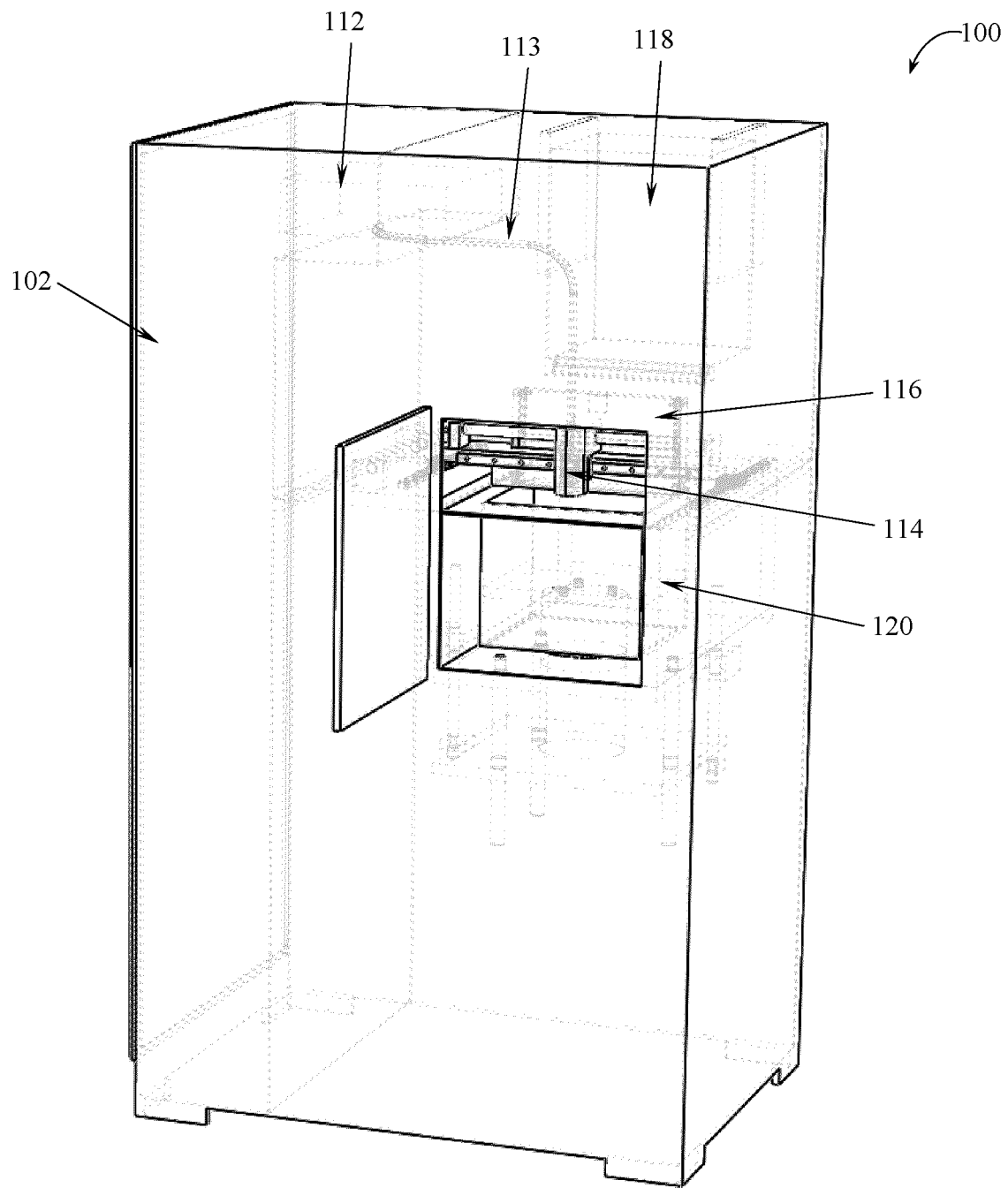
FIG. 9 is a perspective view of an example a laser additive manufacturing system within a system container.

FIG. 9 illustrate the container 102 of the laser additive manufacturing system 100. The container 102 can be shaped and sized to house all the components of the system 100, such as laser 112, fiber optic 113, optic head 114, powder storage container 118, powder feeder 116 and building chamber 120, most of which are illustrated by dotted lines for clarity.

In operation, the powdered material is put in the powder feeder 116 and then the controller sets up the frequency and amplitude of the vibrations to be applied to the chamber 512. When the vibration system is triggered, the powder feeder 116 starts to vibrate, providing a continuous flow of powdered material out of the powder feeder 116 onto the powder bad. The controller is in communication with the vibration system 516 of the powder feeder 116 (and in some implementation with the storage container 118), the driving system of the feeder 116, the laser 112 and the driving system of the optical head 114 and the building plate 119 so that it can control and synchronize the triggering time of the feeder's vibration system 516 and the laser 112 as well as the powder flow and position of the powder feeder 116, the position of the optic head 114 (and thus the position of the focal point 615) and position of the building plate 119. For example, a number of sensors positioned on the powder feeder 116, optical head 114 and the building plate 119 can provide inputs to the controller. In addition, the controller can be in communication with the level sensors to provide as input the amount of powder material in the feeder 116 and/or storage container 118. A processing unit of the controller receives instructions (input parameters) of the powdered material and the flow rate (weight rate) of the powdered material that needs to be dispensed in the powder bed. Various input parameters can be set directly or through a digital interface. Depending on the size of the dispensing opening 513 and the powder material density, the frequency of the vibration system is adjusted in relation to the powder size (e.g., in a range of 10 to 600 Hz). Typically, a larger powder (0.1 to 0.25 mm) requires lower frequencies and a finer powder (0.02 to 0.05 mm) requires higher frequencies. The powder bed formed on the building plate 119 is set at the predetermined height. The build plate 119 can move in Z-direction up and down to provide layer-by-layer structure of the product. The feeder 116 moves back and forward in Y-direction dispensing powdered material onto the powder bad while the laser optic head 114 moves back and forward along the X-direction moving the laser beam 614 to a different focal point 615 melting the powdered material at such focal points and producing small volume of melt pools. The melting pools are then rapidly solidified forming a layer of a product. Then this process is repeated by moving the building plate 119 so that additional powder layers can be added and melted to get a layer-by-layer fabrication of the work product.

In one implementation, the laser additive manufacturing system 100 can comprise two optic heads 114 that can be coupled to the energy source 112 (e.g. laser 112) in parallel or in series to reduce the manufacturing time (printing time) of the product. The two optic heads can move along the same sliding system 115 or each of the optical heads can slide along their own (separate) sliding system 115. In yet another implementation, the system 100 can comprise two or more laser optic heads 114 that can be coupled to one or more energy sources 112. Each of the multiple optical heads can deliver the laser beam to a separate powder bad so that multiple parts can be manufactured simultaneously. More then one powder feeder 116 can be used to disperse powder material to the multiple powder beds.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. A laser additive manufacturing system comprising:
an energy source configured to generate a laser beam;
a fiber optic coupled to the energy source to transmit the laser beam;
a laser optic head coupled to the fiber optic and comprising a housing, a focus lens positioned in the housing to focus the laser beam, and a laser window configured to protect the focus lens from a melted material vapor, the laser optic head being in communication to a driver to drive the laser optic head along a sliding mechanism in X-direction;
a shield gas cup with a bore through which the laser beam passes is coupled to the laser window of the laser optic to provide gas shield over a powdered material that is in proximity to a focal point to protect the powdered material from oxidization and material vapor;
a gas chamber coupled to a gas supply providing a gas into the housing of the laser optic head, wherein the gas flows around the focus lens and the laser window cooling them;
a building chamber with a build plate that is coupled to a driver to move the building plate in Z-direction, a powder bed is defined on the build plate;
a powder feeder having an inner cavity and a dispensing opening for dispensing the powdered material onto the powder bed, the powder feeder is in communication to a feeder driver to drive the powder feeder along a sliding system in Y-direction; and
a container housing the energy source, the fiber optic, the laser optic head, the building chamber and the powder feeder,
wherein the laser beam generated by the energy source is focused using the laser optic head onto the focal point on the powder bed producing volumes of melt pools.

2. The system of claim 1, further comprising a controller in communication with the driver of the laser optic head, the driver of the powder feeder and the driver of the build plate, the controller controlling the movement and position of each of the laser optic head, powder feeder and the building plate.

3. The system of claim 2, further comprising a plurality of sensors to provide input to the controller of the position of the laser optic head, powder feeder and the building plate.

4. The system of claim 2, wherein the powder feeder further comprises a vibration system having a driver and is configured to provide a continuing periodic oscillation of the powder feeder.

5. The system of claim 4, wherein the controller is in communication with the driver of the vibration system to control a frequency and an amplitude of the vibrations.

6. The system of claim 1, further comprising at least one storage container to store the powdered material, the powder feeder is in fluid communication with the at least one storage container.

7. The system of claim 1, wherein the energy source is a laser diode.

8. The system of claim 1, wherein the energy source is a $CO_2$ laser.

9. The system of claim 1, wherein the energy source is a YAG type laser.

10. The system of claim 1, wherein the powder material is a metal powder.

11. The system of claim 1, wherein the powder material is a polymer material.

12. The system of claim 1, wherein the powder material is a metal powder and a polymer material.

13. The system of claim 10, further comprises a heater to preheat the metal powder.

14. The system of claim 1, further comprising a fume extraction system having a housing with a fan positioned in the container, a driver to turn the fan and an outlet that is in communication with outside surroundings.

15. The system of claim 14, further comprising a filter positioned in the housing of the fume extraction system.

* * * * *